United States Patent
Perry

(10) Patent No.: US 10,315,108 B2
(45) Date of Patent: Jun. 11, 2019

(54) LOCAL APPLICATION QUICK START WITH CLOUD TRANSITIONING

(71) Applicant: Sony Interactive Entertainment America LLC, San Mateo, CA (US)

(72) Inventor: David Perry, San Mateo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 258 days.

(21) Appl. No.: 14/845,104

(22) Filed: Sep. 3, 2015

(65) Prior Publication Data

US 2017/0050110 A1 Feb. 23, 2017

Related U.S. Application Data

(60) Provisional application No. 62/207,285, filed on Aug. 19, 2015.

(51) Int. Cl.
*A63F 9/24* (2006.01)
*A63F 13/355* (2014.01)
(Continued)

(52) U.S. Cl.
CPC .......... *A63F 13/355* (2014.09); *A63F 13/23* (2014.09); *A63F 13/30* (2014.09); *A63F 13/45* (2014.09);
(Continued)

(58) Field of Classification Search
CPC ........ A63F 13/355; A63F 13/23; A63F 13/30; A63F 13/45; A63F 13/48; A63F 2300/534; H04L 65/4069; H04L 67/10
See application file for complete search history.

(56) References Cited

U.S. PATENT DOCUMENTS 8,898,717 B1  11/2014 Labrozzi et al.
10,039,978 B2  8/2018 Gault et al.
(Continued)

FOREIGN PATENT DOCUMENTS

CN  103155521 A  6/2013
CN  103403694 A  11/2013
CN  103886009 A  6/2014

OTHER PUBLICATIONS

PCT/2016/044888 International Search Report and the Written Opinion dated Oct. 14, 2016, 15 pages.
(Continued)

*Primary Examiner* — Justin L Myhr
(74) *Attorney, Agent, or Firm* — Penilla IP, APC

(57) ABSTRACT

A method is provided, including: receiving at a client device a first command to initiate a cloud video game; in response to receiving the first command, retrieving, by the client device, initial content from a client local storage; rendering the initial content to a display device; sending a first request from the client device to a cloud gaming service to access the cloud video game, the cloud gaming service being configured to assign the client device to a gaming machine configured to execute the cloud video game; receiving at the client device a second command to initiate interactive gameplay; in response to receiving the second command, sending a second request from the client device to the cloud gaming service, the cloud gaming service being configured to, in response to receiving the second request, initiate streaming of interactive gameplay content generated by the executing cloud video game to the client device.

13 Claims, 10 Drawing Sheets

(51) Int. Cl.
*A63F 13/30* (2014.01)
*A63F 13/23* (2014.01)
*A63F 13/45* (2014.01)
*A63F 13/48* (2014.01)

(52) U.S. Cl.
CPC ........ *A63F 13/48* (2014.09); *A63F 2300/534* (2013.01); *A63F 2300/5566* (2013.01)

(56) References Cited

U.S. PATENT DOCUMENTS

| | | | | |
|---|---|---|---|---|
| 2002/0144276 | A1* | 10/2002 | Radford | H04N 7/17318 725/87 |
| 2004/0148221 | A1 | 7/2004 | Chu | |
| 2005/0246738 | A1* | 11/2005 | Lockett | H04N 5/4403 725/43 |
| 2011/0075997 | A1* | 3/2011 | Begen | H04N 21/4305 386/356 |
| 2012/0158883 | A1* | 6/2012 | Ikenaga | G06F 9/06 709/213 |
| 2012/0184373 | A1* | 7/2012 | Kim | H04L 65/4084 463/42 |
| 2012/0278439 | A1* | 11/2012 | Ahiska | H04L 67/2852 709/218 |
| 2013/0268583 | A1* | 10/2013 | Sheppard | H04L 29/06047 709/203 |
| 2014/0037305 | A1 | 2/2014 | Monde et al. | |
| 2014/0057722 | A1* | 2/2014 | Justice | A63F 13/12 463/42 |
| 2014/0267429 | A1* | 9/2014 | Justice | G06T 3/60 345/649 |
| 2015/0126282 | A1 | 5/2015 | Hitomi et al. | |
| 2015/0283462 | A1* | 10/2015 | Chan | A63F 13/12 709/203 |

OTHER PUBLICATIONS

Anonymous: "Cloud gaming—Wikipedia, the free encyclopedia", Aug. 16, 2015, XP055308747, Retrieved from the internet: URL:https://en.wikipedia.org/w/index.php?title=Cloud_gaming&oldid=676381901 [retrieved on Oct. 7, 2016], the whole document (8pgs).

Anonymous: "What is Cloud Gaming, and Is It Really the Future?", Apr. 12, 2013, XP055308714, Retrieved from the internet: URL:http://www.howtogeek.com/160851/htg-explains-what-is-cloud-gaming-and-is-it-the-future/[retrieved on Oct. 7, 2016], the whole document (4pgs).

Office Action issued in corresponding Chinese Patent Application No. 201610693724.8, dated Apr. 1, 2019 (21 total pages).

* cited by examiner

LOCAL APPLICATION QUICK START WITH CLOUD TRANSITIONING

CLAIM OF PRIORITY

This application claims priority to U.S. Provisional Patent Application No. 62/207,285, filed Aug. 19, 2015, entitled "Local Application Quick Start with Cloud Transitioning," the disclosure of which is incorporated by reference herein.

FIELD OF THE INVENTION

The present disclosure relates to systems and methods for providing cloud video games for user interaction, and more specifically to local video game initialization with transitioning to cloud streaming of the video game.

BACKGROUND

Description of the Related Art

A current area of rapidly growing technology is the field of cloud gaming. Users are able to access a number of games on a cloud gaming site over a network, such as the Internet, and begin interaction/playing the game. In order to select a game for game play, a user accesses his/her account on the cloud gaming site. The user is provided with a list of games that are available for the user account for game play. When the user selects a game for viewing and/or game play, the user will have to wait till the user account is assigned to a cloud gaming machine, the game code is loaded, graphics engines initialized, graphics are loaded, game and user settings are uploaded, etc., before he can access the game for game play, for example. Furthermore, as the progression through initial content of the video game is generally a linear process, the user will be required to wait after each selection point or other break point in the initial content of the video game, as the subsequent content is loaded, executed, and streamed to the users client device. The wait time for accessing and playing a select game may be longer for games that are graphic intensive. The waiting may cause the user to lose interest in the game and to stop interacting with the game site, resulting in a potential loss to the game developer/game site owner.

It is within this context that embodiments of the invention arise.

SUMMARY OF THE INVENTION

Embodiments of the present disclosure provide methods and systems that are used to provide cloud-based video games.

In accordance with some implementations, a method is provided, including the following method operations: receiving at a client device a first command to initiate a cloud video game; in response to receiving the first command, retrieving, by the client device, initial content for the cloud video game from a client local storage; rendering the initial content to a display device connected to the client device, the rendered initial content defining content for the cloud video game that is configured to be rendered prior to rendering interactive gameplay content of the cloud video game; further in response to receiving the first command, sending a first request from the client device to a cloud gaming service to access the cloud video game, the cloud gaming service being configured to, in response to receiving the first request, assign the client device to a gaming machine that is configured to execute the cloud video game and prepare for streaming of interactive gameplay content generated by the executing cloud video game to the client device; receiving at the client device a second command to initiate interactive gameplay of the cloud video game; in response to receiving the second command, sending a second request from the client device to the cloud gaming service, the cloud gaming service being configured to, in response to receiving the second request, initiate streaming of the interactive gameplay content generated by the executing cloud video game to the client device.

In some implementations, the rendered initial content does not affect a level of user progress or accomplishment within a gameplay context of the cloud video game.

In some implementations, the rendered initial content defines one or more of a recitation of legal information, a logo presentation, a splash screen, a loading screen, a rating screen, a menu.

In some implementations, the rendered initial content defines a configuration procedure for an interface device that is configured to provide user-defined input for the cloud video game.

In some implementations, the streaming of the interactive gameplay content to the client device is defined by transmission of a video stream and an audio stream from the cloud gaming service to the client device for rendering by the client device.

In some implementations, the cloud gaming service is configured to prepare for streaming of interactive gameplay content by accessing saved game data and defining a state of the executing cloud video game in accordance with the saved game data.

In accordance with some implementations, a method is provided, including the following method operations: receiving at a client device a first command to initiate a cloud video game; in response to receiving the first command, retrieving, by the client device, initial content for the cloud video game from a client local storage; rendering the initial content to a display device; further in response to receiving the first command, sending a first request from the client device to a cloud gaming service to access the cloud video game, the cloud gaming service being configured to, in response to receiving the first request, execute the cloud video game and prepare for streaming of interactive gameplay content generated by the executing cloud video game to the client device; receiving at the client device a second command to initiate interactive gameplay of the cloud video game; in response to receiving the second command, sending a second request from the client device to the cloud gaming service, the cloud gaming service being configured to, in response to receiving the second request, initiate streaming of the interactive gameplay content generated by the executing cloud video game to the client device.

In some implementations, the rendered initial content does not affect a level of user progress or accomplishment within a gameplay context of the cloud video game.

In some implementations, the rendered initial content defines one or more of a recitation of legal information, a logo presentation, a splash screen, a loading screen, a rating screen, a menu, or a configuration procedure for an interface device that is configured to provide user-defined input for the cloud video game.

In some implementations, the streaming of the interactive gameplay content to the client device is defined by transmission of a video stream and an audio stream from the cloud gaming service to the client device for rendering by the client device.

In some implementations, the cloud gaming service is configured to prepare for streaming of interactive gameplay content by accessing saved game data and defining a state of the executing cloud video game in accordance with the saved game data.

In some implementations, the method further includes: further in response to receiving the second command and initiating streaming of the interactive gameplay content to the client device, receiving user input at the client device defined from user interactivity with the interactive gameplay content, and transmitting the user input from the client device to the cloud gaming service for processing by the executing video game.

In some implementations, the method further includes: receiving at the client device a third command to terminate gameplay of the video game; in response to receiving the third command, sending a third request from the client device to the cloud gaming service, the cloud gaming service being configured to, in response to receiving the third request, determine whether an update to the initial content that is stored in the client local storage is required, and if so, then send the update to the client device.

In accordance with implementations of the disclosure, a method is provided, including the following method operations: executing a cloud video game by a cloud gaming machine, the executing cloud video game being configured to generate video content for streaming to a client device; identifying cacheable visual content that is configured to be cached at the client device, the cacheable visual content including one or more visual assets; sending a mixed data stream to the client device that includes the video content and the cacheable visual content, wherein the client device is configured to store the cacheable visual content to a client cache, and wherein the client device is further configured to assemble the video content with one or more of the visual assets to define a client image stream for rendering to a display.

In some implementations, the executing cloud video game is configured to identify the visual assets that have been stored to the client cache, and wherein generating the video content is configured to exclude the visual assets that have been stored to the client cache from the generated video content.

In some implementations, the executing cloud video game is configured to generate identification data identifying the one or more of the visual assets to be assembled with the video content, wherein the mixed data stream includes the identification data.

In some implementations, the identification data further defines a spatial or temporal location within image frames of the video content at which the one or more of the visual assets is to be inserted into the video content.

In some implementations, identifying and sending the cacheable content to the client device is in response to determining that a gameplay completion of the cloud video game has exceeded a predefined threshold.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

Several operations are performed by a server(s) within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to a user. Game data associated with a game includes generic game data and user-specific game data. Therefore, initializing the files includes identifying, loading, and initializing generic game data and user-specific game data. Initializing generic game data may include initializing a graphics engine, installing graphics data, initializing sound files, installing art work, etc. Initializing user specific data may include locating and installing user data, user history, game history, etc. Loading of the generic game data may take anywhere from a few seconds to a few minutes depending on the complexity of the game/graphics of the game.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, the audio content may be rendered and a selection/navigation screen is presented for user selection/customization. User selection input provided at the selection/navigation screen may include game level selection, game icon(s) selection, game mode selection, game winnings, other user-related data that may require uploading of additional game content. Uploading of user selection input can cause additional delay before the game content is made available to the user for game play. In some embodiments, game content is made available by streaming the game content from the game cloud system to a user's computing device for viewing and interacting. After loading user specific data, the game content is available for game play.

Figure 1A:
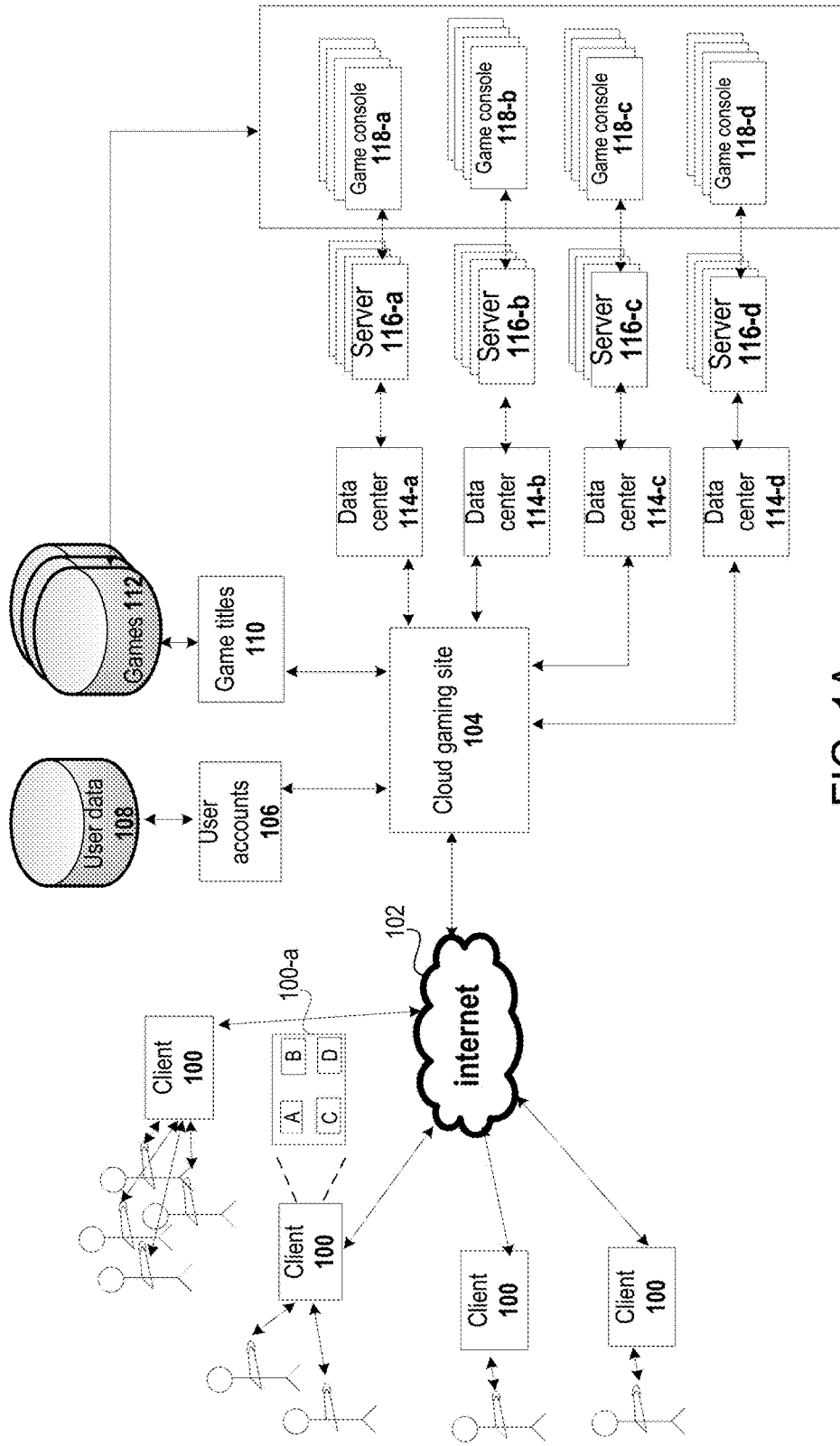
FIG. 1A illustrates a simplified block diagram of an exemplary system that is used to preload game content onto a cloud game server, in accordance with an embodiment of the present invention.

FIG. 1A illustrates an exemplary system used to load game files for a game available through a cloud gaming site. The system includes a plurality of client devices 100 that are communicatively connected to the cloud gaming site 104 over a network 102, such as the Internet. When a request to access the cloud gaming site 104 is received from a client device 100, the cloud gaming site 104 accesses user account information 106 stored in a user data store 108 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 110 to identify the game titles that are available at the game cloud site for the user account initiating the request. The game titles data store 110, in turn, interacts with a games database 112 to obtain the game titles for all the games that are available for the cloud gaming site. As new games are introduced, the games database 112 will be updated with the game code and the game titles data store 110 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 100-a, as shown in FIG. 1A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 1B:
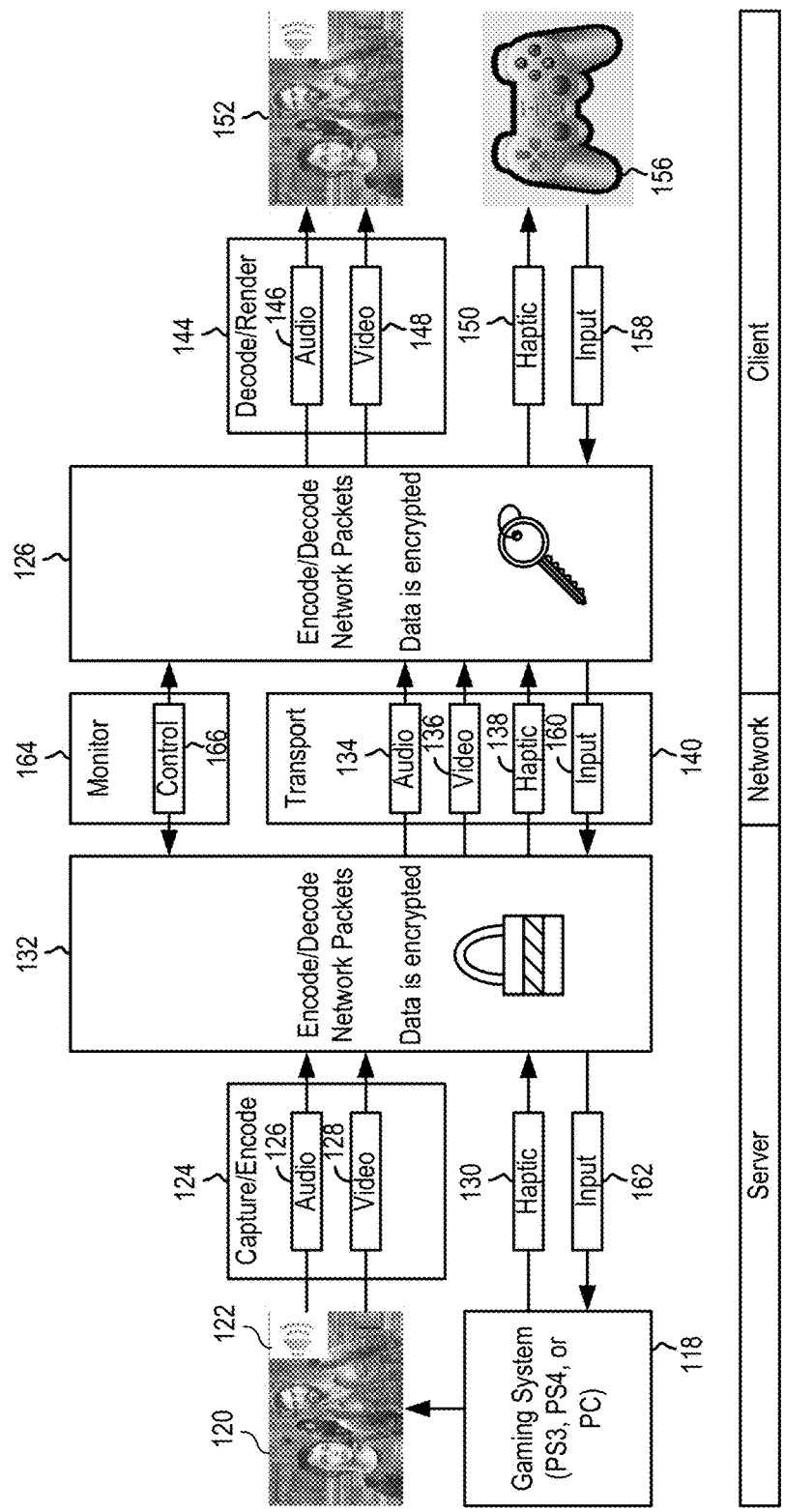
FIG. 1B is a flow diagram conceptually illustrating various operations which are performed for streaming a cloud video game to a client device, in accordance with implementations of the disclosure.

FIG. 1B is a flow diagram conceptually illustrating various operations which are performed for streaming a cloud video game to a client device, in accordance with implementations of the disclosure. The gaming system 118 executes a video game and generates raw (uncompressed) video 120 and audio 122. The video 120 and audio 122 are captured and encoded for streaming purposes, as indicated at reference 124 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 126 and encoded video 128 are further packetized into network packets, as indicated at reference numeral 132, for purposes of transmission over a network such as the Internet. The network packet encoding process can also employ a data encryption process, thereby providing enhanced data security. In the illustrated implementation, audio packets 134 and video packets 136 are generated for transport over the network, as indicated at reference 140.

The gaming system 118 additionally generates haptic feedback data 130, which is also packetized into network packets for network transmission. In the illustrated implementation, haptic feedback packets 138 are generated for transport over the network, as further indicated at reference 140.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 140, the audio, video, and haptic feedback packets are transported over a network, such as and/or including the Internet. As indicated at reference 142, the audio packets 134, video packets 136, and haptic feedback packets 138, are decoded/reassembled by the client device to define encoded audio 146, encoded video 148, and haptic feedback data 150 at the client device. If the data has been encrypted, then the network packets are also decrypted. The encoded audio 146 and encoded video 148 are then decoded by the client device, as indicated at reference 144, to generate client-side raw audio and video data for rendering on a display device 152. The haptic feedback data 150 can be processed/communicated to produce a haptic feedback effect at a controller device 156 or other interface device through which haptic effects can be rendered. One example of a haptic effect is a vibration or rumble of the controller device 156.

It will be appreciated that a video game is responsive to user inputs, and thus, a similar procedural flow to that described above for transmission and processing of user input, but in the reverse direction from client device to server, can be performed. As shown, a user operating controller device 156 may generate input data 158. This input data 158 is packetized at the client device for transport over the network to the cloud gaming system. The input data packets 160 are unpacked and reassembled by the cloud gaming server to define input data 162 on the server-side. The input data 162 is fed to the gaming system 118, which processes the input data 162 to update the game state of the video game.

During transport (ref. 140) of the audio packets 134, video packets 136, and haptic feedback packets 138, the transmission of data over the network can be monitored to ensure the cloud game stream quality of service. For example, network conditions can be monitored as indicated by reference 164, including both upstream and downstream network bandwidth, and the game streaming can be adjusted in response to changes in available bandwidth. That is, the encoding and decoding of network packets can be controlled based on present network conditions, as indicated by reference 166.

Figure 2:
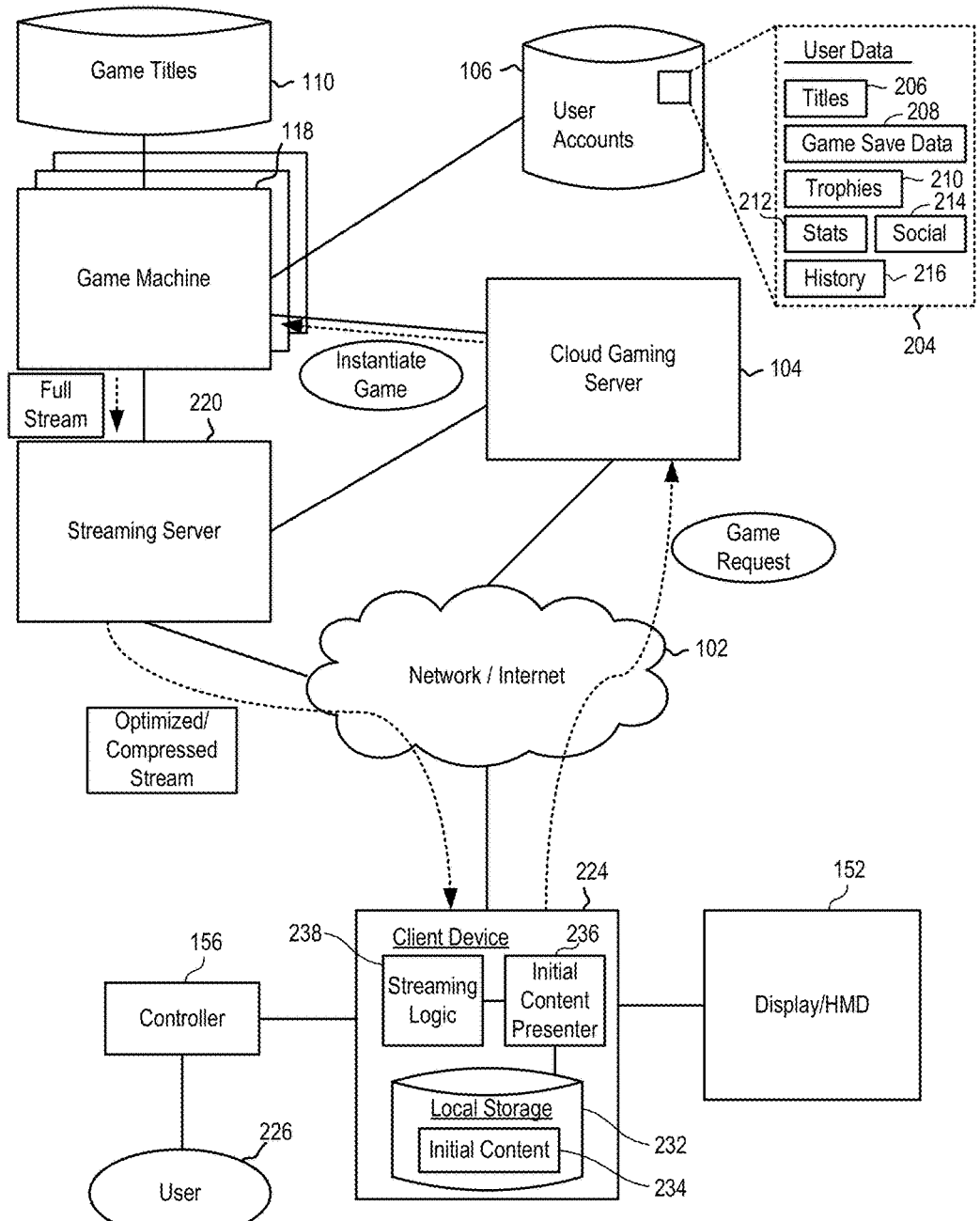
FIG. 2 conceptually illustrates a system for cloud gaming with local application quick start functionality, in accordance with implementations of the disclosure.

FIG. 2 conceptually illustrates a system for cloud gaming with local application quick start functionality, in accordance with implementations of the disclosure. The user 226 interacts with a client device 100 that is configured to access a cloud gaming service. The user 226 may operate a controller device 156 to generate and provide input to the client device 100. Furthermore, the client device 100 can be configured to render content to a display device 152. It will be appreciated that in some implementations, the display device 152 can be a head-mounted display.

The client device communicates over network 102 to a cloud gaming server 104, which provides access to the user's cloud gaming account. The cloud gaming server 104 retrieves user data 204 from a user accounts storage 106, the user data 204 being specific for the user 226 in the illustrated embodiment. By way of example, the user data 204 can include various cloud gaming related data such as titles 206 which are the available game titles for gameplay by the user. These may be game titles which the user has purchased, rented, borrowed, been awarded, or to which the user has otherwise obtained access for gameplay. The user data may also include game save data 208, trophies 210, statistics 212, social data 214 (e.g. including social graph data), and history data 216 (e.g. user access history, gameplay history, etc.).

When the user 226 wishes to play a given cloud video game to which the user has access permission, the user may indicate selection of the video game on a graphical user interface (GUI) presented by the client device 100 on the display 152. Upon selection of the video game for gameplay, a game request is transmitted from the client device 100 to the cloud gaming server 104. The game request may identify the game title that the user wishes to play. In response to receiving the game request, the cloud gaming server 104 activates a cloud game machine 118 to instantiate the requested video game title. That is, the cloud game machine 118 is assigned to the requesting client device 100, and begins executing the requested video game title.

Simultaneous with the communication of the game request by the client device 100 to the cloud gaming server 104, the client device 100 also begins rendering initial content 234 from a local storage 232. An initial content presenter 236 manages the retrieval, rendering, and interactivity with the initial content 234. The initial content 234 can be specific to the requested video game, and may include any game-related content that may be presented to the user preceding the commencement of interactive gameplay of the video game.

For purposes of the present disclosure, interactive gameplay shall refer to interactivity between the user and the executing video game that is directly capable of substantively advancing the progress of the user within the competitive/narrative context of the video game. Thus, interactive gameplay of the video game does not include other types of content renderings or game-related interactions such as start-up images/videos, splash/loading screens or videos, legal information screens, accessing or configuring game settings (e.g. controller settings, game difficulty, video settings, audio settings, etc.), game selection menus (e.g. saved game selection, game level selection, game type selection (e.g. arcade, campaign), etc.), and/or any other type of game-related content or interactive feature that is not directly capable of advancing the user's progress within the competitive or narrative context of the video game.

As noted, the initial content 234 of the video game includes content that is presented prior to commencement of interactive gameplay. The initial content 234 can include such content as logo screens, startup/splash screens (images or animations/videos), legal information/disclaimer screens, peripheral device configuration menus, feature setting menus, etc. Since the initial content 234 is locally accessible from the local storage 232, the rendering of the initial content 234 can occur every quickly, and may be practically immediate or instantaneous in very fast systems. The user does not have to wait for the cloud gaming system—to provision/assign a game machine 118 for the client 100, load the appropriate video game code to the assigned game machine 118, begin execution of the video game code, and/or initiate streaming to the client 100—before content of the video game is rendered to the display device 152. This provides for a local quick start to the video game, while the cloud gaming system readies the game machine 118 for game streaming. Thus, the user is provided initial content with which to engage and enjoy, rather than being forced to wait for the cloud gaming system's operations which could be perceived as a poor cloud gaming experience.

The game machine 118 obtains the requested game title code from game titles data store 110, and executes the game title code to define the executing video game. The raw video/audio output from the game machine 118 is provided to a streaming server 220, which encodes the raw video/audio to a compressed format for streaming purposes. As noted above, the encoded audio and video can be transmitted over network 102 in accordance with network communication protocols. Streaming logic 238 at the client device 224 processes the incoming streaming audio/video for rendering to the display 152.

It will be appreciated that a transition will occur from presentation of the initial content 234 from the local storage 232 to presentation of the streamed video game from cloud-based game machine 118 via streaming server 220. In some implementations, the execution of the video game at the game machine 118 proceeds until a certain point is reached, at which point the video game awaits a trigger to initiate streaming of the video game to the client device 100. In some implementations, the trigger to initiate streaming may be defined from a user input received at the client device 100. For example, the user may press a button or provide some other input via the controller 156 to initiate streaming.

The transition from local execution/presentation of content to cloud streaming of content can be configured to provide a smooth user experience. The execution of the video game by the game machine 118 can be synchronized to the presentation of initial content at the client device. The game machine 118 may receive status updates from the client device 224 regarding the presentation of the initial content, and the execution of the video game by the cloud game machine 118 can be adjusted so as to be synchronized with the presentation of the initial content 234, and therefore allow for a smooth transition to cloud streaming. It will be appreciated that in some implementations, the transition from local content to streaming content occurs automatically without requiring user input, whereas in other implementations, the transition occurs in response to user input.

The transition from rendering of the initial content to streaming of the video game from the cloud may occur at various points in the overall game presentation. For example, the transition may occur following rendering of a splash screen (image/animation/video), or following rendering of a menu or other content requiring an active selection or input by the user. In the latter concept, the user selection (e.g. of a menu item or option) or input can be communicated to the executing video game at the game machine 118, which may process the selection/input to determine the next content to be rendered. In some implementations, the next content to be rendered will be another splash screen or menu, and thus the transition from local execution of initial content to cloud video game streaming occurs in between screens/menus presented prior to the initiation of interactive gameplay. In some implementations, the cloud game machine 118 can receive a status update regarding which of several screens is being presented at the client device 224, and the game machine 118 can be directed to execute and render the next screen, which will be streamed to the client device 224.

In some implementations, the transition occurs during the presentation of a single content screen. For example, the initial content 234 might include a plurality of screens which are presented in series. During the local presentation of the screens, cloud game machine 118 can receive status updates indicating which screens are being presented, and the cloud game machine 118 can be directed to execute and render the same screen as that which is currently being presented by the client device 224. The transition to streaming can thus occur during the presentation of the current screen, and may appear seamless to the user. In some implementations, the image/video portion of the screen content is transitioned to streaming first, whereas the audio is not transitioned until the presentation of the next screen. In some implementations, wherein the audio is defined by looped playback of an audio clip, the transition (of both the video and audio, or the audio only) may occur when the audio playback reaches the end of the clip. Such a configuration can avoid audible breaks in the audio presentation.

In some implementations, the trigger to initiate streaming of the video game also triggers initiation of interactive gameplay of the video game. For example, the initiation content can include all content of the video game that is to be presented to the user prior to initiating actual interactive gameplay. Then, at the point of initiating interactive gameplay, the client device 100 transitions from presenting locally stored content to presenting cloud-based streaming content. Further, it will be appreciated that user interactions with the initial content, such as user selections or other user inputs, can be communicated to the executing video game. In this manner, interactions with locally stored content can be used to drive the execution of the cloud-based video game. For example, the user may indicate a menu selection and this will be communicated to the executing video game on the game machine 118. The presentation of the menu will be from the local storage 232; however, following the user selection from the menu, the user selection may be communicated to the game machine 118 (e.g. via cloud gaming server 104) and the game machine 118 may process the user selection. The client device 100 may also transition to streaming the result of the user selection (e.g. to initiate interactive gameplay of the video game) from the game machine 118 via streaming server 220.

As will be appreciated by those skilled in the art, the executing video game may define a game engine which receives input, and processes the input to update the game state of the video game. In some implementations, the game engine of the video game is initialized at the game machine 118, while the initial content 234 is being presented at the client device. The game engine may be initialized and then entered into a paused state, as the game machine awaits a trigger to continue execution of the game engine. Upon receipt of the trigger, which can be defined from a user input, the paused state is exited and the resulting execution of the game engine provides for the initiation of interactive gameplay of the video game.

In some implementations, the client device 224 can be configured to communicate status updates to the cloud gaming system regarding the presentation of the initial content 234. Such status updates can include information identifying a current state of presentation of the initial content, as well as user inputs/selections/navigation. In response to such status updates, the execution of the video game by the game machine 118 can be directed to perform any of various options within the context of the video game. The transition between rendering of initial content 234 by the client device 224 to streaming of the video game from the streaming server 220 can thus be managed and synchronized to provide a smooth user experience.

In some implementations, the initialization of the game engine at the game machine can be configured to automatically load the user's last saved game data, as in many cases, a user will typically wish to continue gameplay from their last saved location. It will be appreciated that this automatic loading of the user's last saved game data can occur preemptively, before the user even indicates (e.g. through navigation/selection of game menus/options) that he/she wishes to continue gameplay of their last saved game. This is made possible through the division of processing wherein the client device processes and renders initial content while the cloud-based game machine initializes the game engine for eventual interactive gameplay. The presently described configuration thus provides an advantage over the gaming experience of even conventional console games, as the user is not required to wait for their local device to sequentially load the initial content and then load their saved game, for they are respectively handled in parallel by each of the local client device 100 and the cloud-based game machine 118.

In some implementations, the cloud gaming server 104 can be configured to determine whether or not to preemptively load the last saved game for a given video game based on the user's gameplay history. For example, in some implementations, the system may be configured to automatically load the user's last saved game if during the user's last gameplay session of the video game, the user loaded the previously last saved game. In a related implementation, the system may be configured to automatically load the user's last saved game if less than a threshold amount of time has elapsed since the last gameplay session, and during the user's last gameplay session of the video game, the user loaded the previously last saved game. In other implementations, the system may be configured to determine whether or not to automatically load the user's last saved game based on various factors such as social network activity, time of day, length of time since last gameplay, relative amount of gameplay of saved games versus non-saved games (e.g. arcade, multi-player) of the video game, etc.

In the illustrated implementation, during interactive gameplay the game machine 118 executes the game engine to generate full uncompressed streams of video and audio data. The streaming server 220 receives the full video and audio data streams, and processes them for transmission over the network 102 to the client device 100. The processing may entail encoding the video and audio data into a compressed format, encrypting the compressed data, and packetizing the data in accordance with network protocols for transmission. The client device 100 receives the transmitted data, reassembles the network packets, and decrypts and decodes the compressed video/audio data for rendering to a display/HMD 152 and an audio device (which may be part of the display 152).

In the above-described implementation, the streaming server streams a compressed version of the full video and audio streams to the client device 100. In some implementations, as discussed in further detail below, the streaming server 220 may be configured to stream versions of the full video and audio streams that are also optimized in other ways. As will be discussed, the streamed video and audio may be configured to have certain content portions/assets left out, which are later supplied at the client 100, so that less bandwidth is required for game streaming or so that the remainder of the streamed video and audio may be streamed at higher fidelity (e.g. higher frame-rate or sample rate, higher resolution, etc.).

Figure 3:
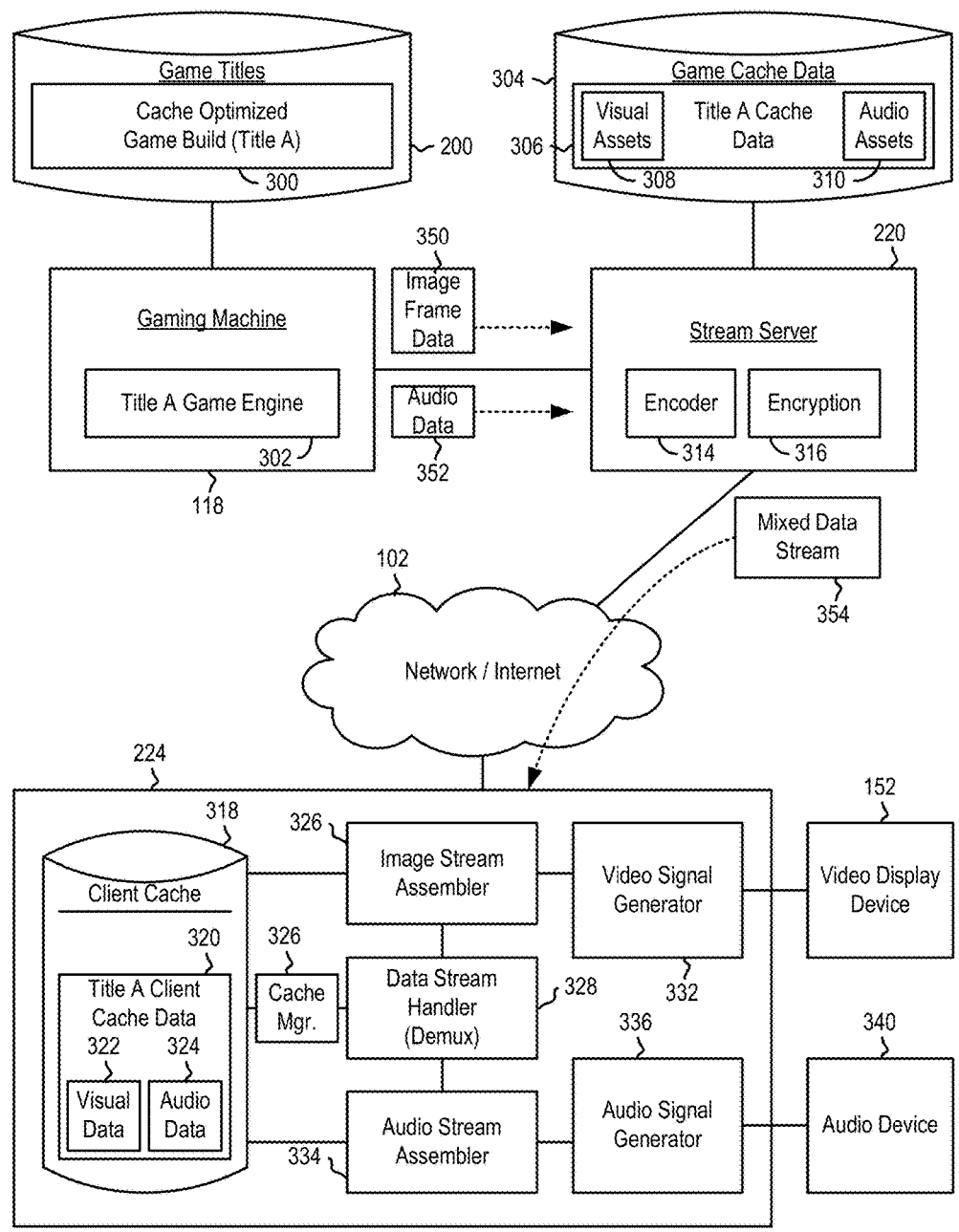
FIG. 3 illustrates a system for providing cache-optimized cloud gaming, in accordance with implementations of the disclosure.

FIG. 3 illustrates a system for providing cache-optimized cloud gaming, in accordance with implementations of the disclosure. Broadly speaking, the illustrated system is configured so that image or audio portions of the video game are stored at the client device, and combined with the streamed video or audio at the client device just prior to rendering on the display, thereby reducing the bandwidth required to stream the video game. The portions to be stored at the client device can be transferred to the device during time periods when there is available bandwidth, as determined from monitoring bandwidth utilization for game streaming and/or network conditions.

In the illustrated implementation, the gaming machine 118 executes a cache optimized game build 300 of a video game (Title A) that is stored in game titles storage 110. The cache optimized game build 300 is a specialized version of the video game title that is configured to provide for the cache-optimized game streaming functionality herein described. In particular, the cache optimized game build 300 is configurable to output video and audio data streams that exclude certain visual or audio components of the video game, which thereby reduces the data size of the video and audio data streams.

The execution of the game build 300 by the game machine 118 defines a game engine 302, that receives and processes inputs to update a game state, and outputs image frame data 350 and audio data 352. The game engine 302 can be configured to optionally exclude certain visual or audio content/assets from the image frame data 350 or audio data 352 that it outputs. For an excluded visual asset, the game engine 302 may generate a visual asset identifier that identifies the excluded visual asset and may further define parameters which control its presentation, such as its placement within the image frame data (defining its temporal location and spatial location), size, orientation, color(s), brightness/contrast, other visual properties, etc. For an excluded audio asset, the game engine 302 may generate an audio asset identifier that identifies the excluded audio asset and may further define parameters which control its presentation, such as volume, balance/fader parameters, placement, equalization parameters, etc. The visual/audio asset identifiers may accompany or be included as part of the image frame data 350 or audio data 352, and serve to indicate what visual or audio asset is to be assembled with the image/audio streams when processed at the client device 100.

A streaming server 220 receives the raw image frame data 350 and audio data 352 which are generated by the game machine 118. An encoder 314 encodes the image frame data 350 and the audio data 352 in compressed video/audio formats. An encryption module 316 encrypts the compressed video/audio for transmission over the network 102. The streaming server 220 is also configured to transmit cache data 306 for the video game from a game cache data storage 304 to the client device 100. The cache data 306 can include visual content/assets 308 and/or audio content/assets 310, which are cacheable content/assets defined for the video game which can be stored at the client device for later assembly with video/audio streams. Thus, the streaming server 220 sends a mixed data stream 354 that can include the compressed video/audio as well as client cacheable visual and/or audio content/assets. It will be appreciated that the encryption module 316 can also encrypt the visual/audio assets for inclusion in the mixed data stream 354 for transmission over the network 102.

The particular timing of the inclusion of visual/audio assets in the mixed data stream 354 can be determined based on current bandwidth usage and network conditions. In some implementations, the streaming server 220 is configured to monitor current bandwidth usage by the streaming of the mixed data stream 354 and determine when available bandwidth exists for streaming the visual/audio assets in addition to the compressed video/audio streams. The streaming server 220 may determine initial network conditions and monitor network conditions on an ongoing basis during game streaming, and the network conditions may be referenced in conjunction with the current bandwidth usage to determine the available bandwidth that exists at any moment.

It will be appreciated that the visual/audio content/assets to be cached are streamed to the client device in advance of their application and rendering by the client device. During periods of relatively low bandwidth utilization, the unused bandwidth can be utilized to stream the visual/audio assets to the client device. The specific visual/audio assets which have been stored at the client device can be tracked, and the game engine can therefore be configured to exclude those visual/audio assets (which are already cached at the client) from being included in the raw image frame data or audio data generated by the game engine.

The mixed data stream 354 is received at the client device 100 and processed by a data stream handler 328. In some implementations, the data stream handler 328 performs a demultiplexing function on the mixed data stream 354 to parse the compressed video, compressed audio, and visual/audio asset streams from the mixed data stream. When visual/audio assets are transmitted in the mixed data stream 354, then the cache manager 326 stores the visual/audio assets to a client cache storage 318, and more specifically as visual content data 322 and/or audio content data 324 which define part of the cache data 320 for the video game.

The data stream handler 328 also produces (e.g. demultiplexes and/or decompresses) video and audio streams from the mixed data stream 354. The video and audio streams are passed to an image stream assembler 326 or an audio stream assembler 334, respectively. The image stream assembler 326 is configured to determine which portions of image frame data have been excluded in the video stream, and fill in these portions with visual content/assets retrieved from the client cache data 320. In some implementations, the aforementioned visual asset identifier is transmitted along with or as part of the mixed data stream, and is processed to identify the visual assets that are to be inserted/combined into the video stream and the parameters regarding their placement and possibly other visual properties. In some implementations, a marker is encoded in the video stream itself, the marker identifying the visual asset to be added and its location within the video stream, both spatial and temporal.

The image stream assembler 326 outputs the fully assembled video stream to a video signal generator 332. The video signal generator 332 processes the fully assembled video stream to generate the appropriate video signal in the correct format for rendering by the display device 152. Though the display device 152 is shown as a separate component in the illustrated system, in some implementations, the display device 152 is incorporated as part of the client device 100.

In a similar manner to the image stream assembler 326, the audio stream assembler 334 is configured to determine which portions of audio data have been excluded in the audio stream, and fill in these portions with audio content/assets retrieved from the client cache data 320. In some implementations, the aforementioned audio asset identifier is transmitted along with or as part of the mixed data stream, and is processed to identify the audio assets that are to be inserted/combined into the audio stream and the parameters regarding their placement and possibly other audio properties. In some implementations, a marker is encoded in the audio stream itself, the marker identifying the audio asset to be added and its location within the audio stream.

The audio stream assembler 334 outputs the fully assembled audio stream to an audio signal generator 336. The audio signal generator 336 processes the fully assembled audio stream to generate the appropriate audio signal in the correct format for rendering by the audio device 340. Though the audio device 340 is shown as a separate component in the illustrated system, in some implementations, the audio device 340 is incorporated as part of the client device 100. Furthermore, in some implementations, the audio device 340 is included as part of the display device 152.

Figure 4:
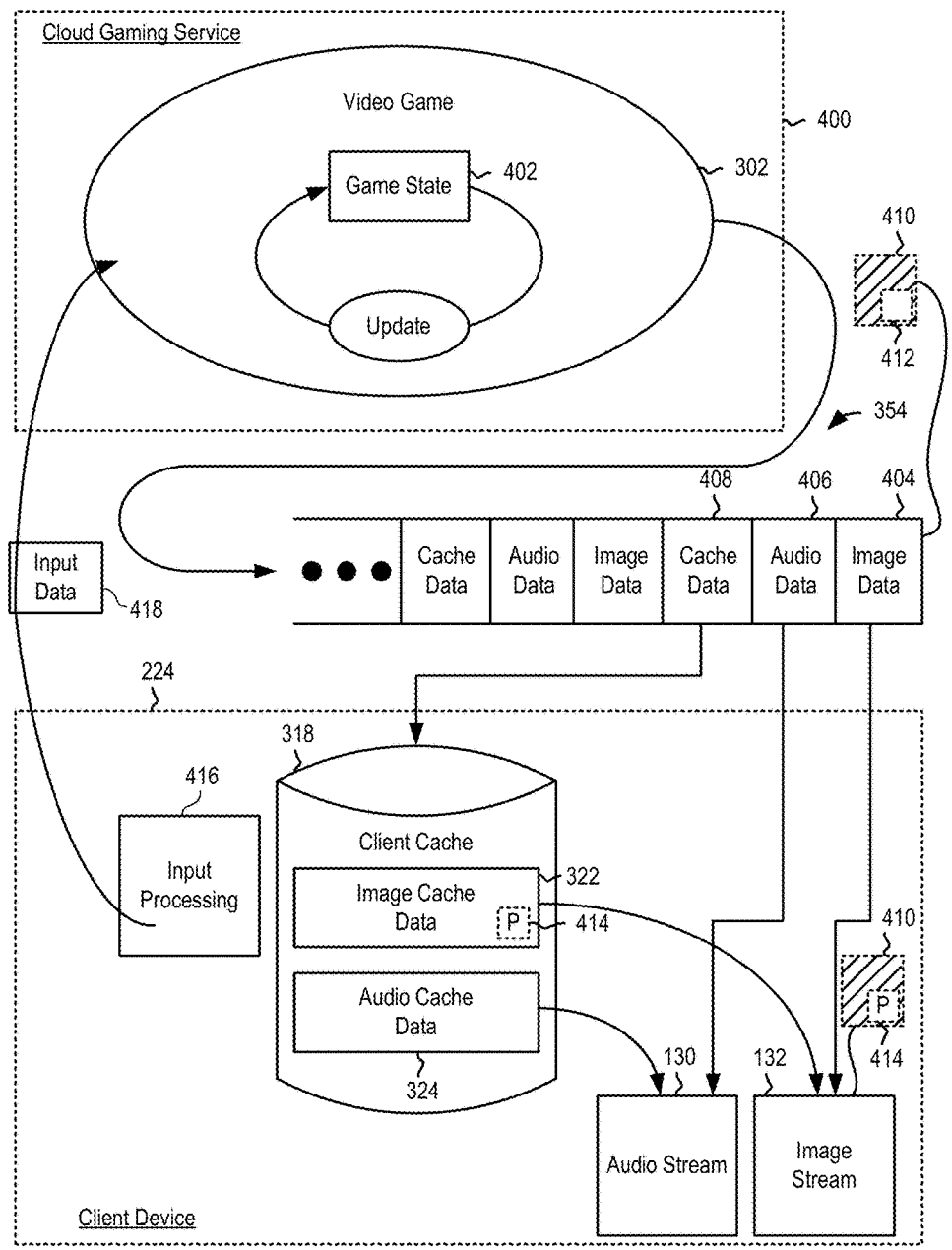
FIG. 4 conceptually illustrates the flow of data to provide for local cache-optimized cloud video game streaming from a cloud gaming service, in accordance with implementations of the disclosure.

FIG. 4 conceptually illustrates the flow of data to provide for local cache-optimized cloud video game streaming from a cloud gaming service 400, in accordance with implementations of the disclosure. The executing video game 302 is shown, which defines a game state 402 that defines the moment-to-moment state of variables for the video game. It will be appreciated that executing video game 302 continually updates the game state 402, based on the current state and based on input data 418 received from the client device 100.

The video game 302, as processed through the cloud gaming service 400, produces a mixed data stream 354. The mixed data stream 354 includes image data 404, audio data 406, and cache data 408. In the illustrated implementation, the image data 404 defines an exemplary image frame 410. A portion 412 of the image frame 410 is not fully defined, that is, the portion 412 is to be supplied by the client device 100, rather than being fully defined/included in the image frame 410, so as to reduce the amount of bandwidth required for streaming the image frame.

Cache data 408 includes data defining assets which are to be inserted into image frames of the image data 404, such as image frame 410. The cache data 408 is received by the client device 100, parsed from the mixed data stream 354, and stored to a client cache storage 318, as part of image cache data 322. In the illustrated implementation, a visual asset 414, which was previously transmitted to the client device 100, is retrieved from the image cache data 322, and inserted into the image frame 410 to define the portion 412 that was previously not fully defined. The resulting completed image frame forms part of the complete image stream 132 for presentation on a display device.

It will be appreciated that visual assets which are transmitted to and cached at the client device can be any type of image, item, object, or other visual property that may be separately provided apart from the video stream generated by the cloud video game, and later inserted into image frames of the video stream at the client device to provide completed image frames for rendering to a display. The visual assets can include static items which are static in the sense that their appearance, when presented in the video stream, is not subject to alteration based on the current game state. These may include, for example, items such as indicators, emblems, trophies, badges, and other types of visual items whose appearance is not dynamically determined based on the current game state. For example, there may be various visual indicators that indicate to the user a current status of a character or of the gameplay, such as powers, items possessed, other users' characters, etc. As another example, a video game in which the user assumes the role of piloting a vehicle may include a view of a cockpit of the vehicle. Some of the visual items in the cockpit may be static, and may not change while the cockpit is being shown in the user's game view, even as the interactive gameplay of the video game proceeds. Static visual assets can be inserted into the video stream at the client device without alteration.

However, it will be appreciated that in some implementations, the visual assets can include dynamic visual assets whose appearance is, at least in part, determined based on game state conditions. For example, dynamic visual assets may be altered in color, size, orientation, transparency, or any other visual property, by the client device based on the current game state, and inserted into the video stream by the client device prior to rendering to the display. To accomplish this, alteration data can be transmitted with the video stream to indicate the specific alterations which are to be performed on the visual asset prior to insertion in the video stream.

In a similar manner to the above discussion, audio data 406 delivered in the mixed data stream 354 can be supplemented with an audio asset from audio cache data 324 to define a completed audio stream 130 for presentation through an audio device. The audio assets can include any of various types of audio or sounds which are utilized by the video game, including without limitation, sound effects, background music, prerecorded audio clips, etc. It will be appreciated that the particular audio which is generated/inserted at the client device versus that which is generated by the cloud gaming machine may vary in different implementations. For example, in some implementations, background music/audio is generated and added to the audio stream at the client device, while other sound effects that are triggered or activated by the user's real-time interactive gameplay are generated by the cloud gaming machine. In one particular implementation, all sound is generated at the client device, based on data generated by the cloud gaming machine and received by the client device in the mixed data stream that identifies the sounds to be produced, the timing of such sounds, and any additional audio-related parameters, e.g. volume, equalization, directionality/origin, etc.

Visual and audio assets can be predictively or preemptively transmitted to the client device, based on the current game state which may be indicative of an expected future game state. This can be useful for mitigating the abrupt increases in bandwidth utilization that may occur at scene changes, when for example, the entire view of the video game scene may change. For example, if a player-controlled character is in a vicinity of or moving towards a physical or temporal location where a scene change may occur, then visual/audio assets may be transmitted to the client device to be utilized at the scene change. For example, if a player directs his character towards a door, and opening or passing through the door results in a scene change, then prior to the opening of the door, visual/audio assets may be transmitted to the client in anticipation of being utilized during the scene change. In another example, when the user is nearing completion of a level or scene of the video game, then visual/audio assets may be transmitted to the client device prior to the completion of the level/scene, for use during the streaming of the next level/scene. In some implementations, when the user's gameplay completion of a scene/level passes a predefined threshold, then visual/audio assets are transmitted to the client device as available bandwidth allows.

An input processing module 416 at the client device 100 is configured to process input from a controller device or other input device, and transmit input data 418 to the executing video game 302. The video game 302 applies the input data 418 to update its game state 402. It will be appreciated that based on this game state, a predicted future game state can be determined, and the transmission of visual/audio assets to the client device can be determined based on the predicted future game state.

Figure 5:
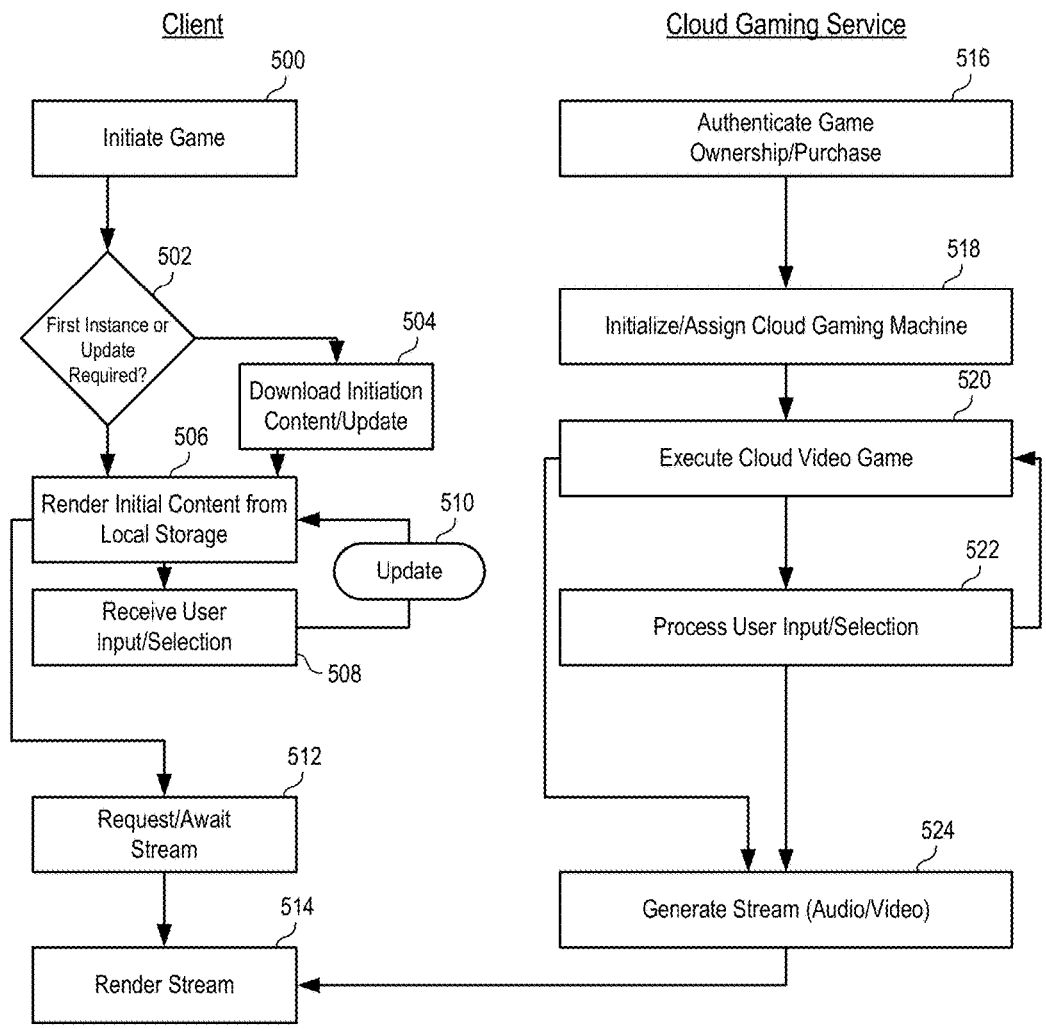
FIG. 5 illustrates a method for providing local application quick start functionality, in accordance with implementations of the disclosure.

FIG. 5 illustrates a method for providing local application quick start functionality, in accordance with an embodiment of the invention. At method operation 500, a request to initiate a video game is received at a client device that is in communication with a cloud gaming service. At method operation 502, it is determined whether this is the first instance of requesting the game, such as an initial purchase of the game, or if an update is required. If so, then at method operation 504, initial content for the video game is downloaded and installed and/or updated. If no update or additional download is required, or following such download and installation/update, then at method operation 506, the initial content of the video game is rendered from the client device's local storage. At method operation 508, user input and/or selection in response to the rendered initial content is processed at the client device, and at method operation 510, the state of rendering of the initial content is updated, thus returning to method operation 506.

Meanwhile, the request to access the video game is communicated to the cloud gaming service, which authenticates the user's game ownership and/or purchase of the requested video game. At method operation 518, a cloud gaming machine is initialized to execute the requested video game and assigned to the user's cloud gaming session. At method operation 520, the cloud gaming machine executes the video game. At method operation 522, user input/selection is processed by the executing video game to update the state of the executing video game. The input/selection can be defined from user interaction with the initial content.

At method operation 512, the client device requests and/or awaits for streaming of the video game to begin. At method operation 524, the cloud gaming service generates and transmits the streaming video/audio of the video game, and at method operation 514, the streaming video/audio is received by the client device and rendered for user interactivity.

Figure 6:
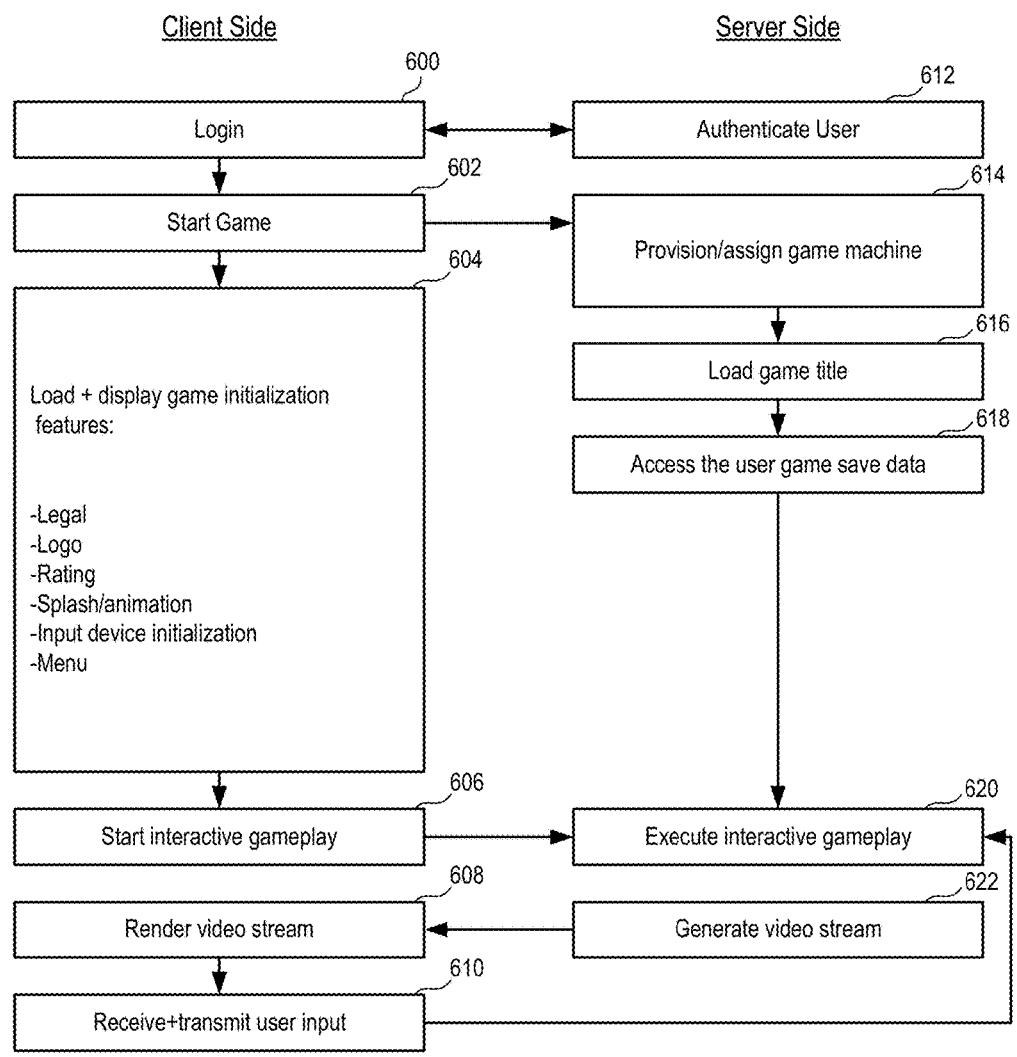
FIG. 6 illustrates a method for providing local application quick start functionality in accordance with implementations of the disclosure.

FIG. 6 illustrates a method for providing local application quick start functionality in accordance with an embodiment of the invention. At method operation 600, the user logs in to the cloud gaming service via a client device, which effects authentication of the user by a cloud gaming server at method operation 612. At method operation 602, the user starts a video game at the client device, and in response, at method operation 604, initial content of the video game is loaded from a local storage of the client device and rendered to a display.

Meanwhile, at method operation 614, in response to the user request to start the video game, a game machine is provisioned/assigned to the user's client device. At method operation 616, the game machine is loaded with the requested video game title. At method operation 618, either anticipatorily or in response to a user request, saved game data from the user's account is accessed and loaded.

At method operation 606, a request is received from the user of the client device to start interactive gameplay. At method operation 620, interactive gameplay is executed by the cloud game machine. At method operation 622, the cloud gaming service generates a video stream that is transmitted to the client device. At method operation 608, the video stream is rendered by the client device. At method operation 610, interactive input is received by the client device and transmitted to the executing video game at the cloud game machine. The executing video game processes the interactive input to update its game state, and based on the updated game state, the video stream is generated as indicated at reference 622.

Figure 7:
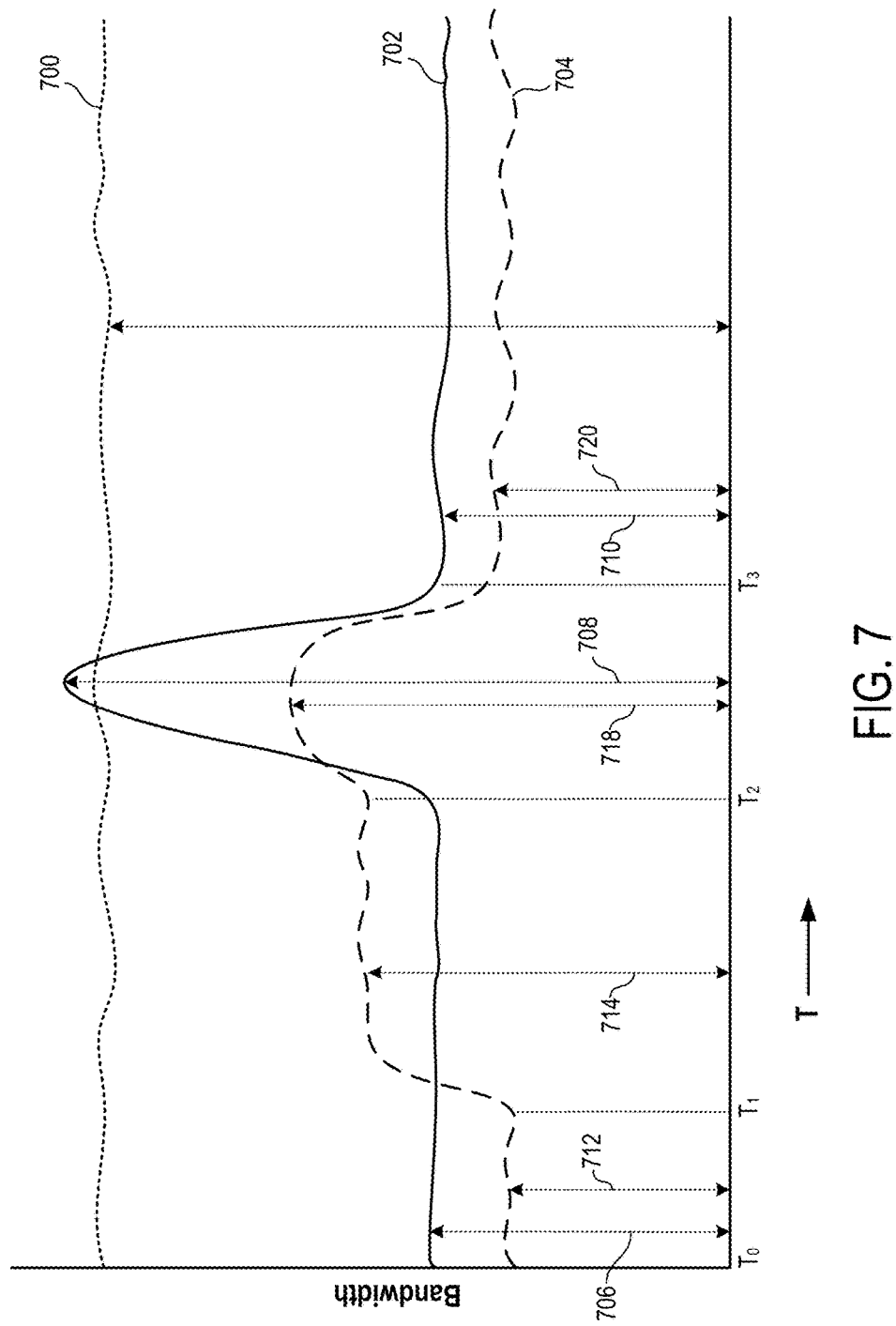
FIG. 7 is a graph depicting data bandwidth versus time, comparing bandwidth utilization for an existing conventional game streaming setup to one that employs a client cache, in accordance with implementations of the disclosure.

FIG. 7 is a graph depicting data bandwidth versus time, comparing bandwidth utilization for an existing conventional game streaming setup to one that employs a client cache, in accordance with implementations of the disclosure. The curve 700 illustrates the maximum available data bandwidth for game streaming. The curve 702 illustrates bandwidth utilization for an existing conventional game streaming setup. The curve 704 illustrates bandwidth utilization for a game streaming setup incorporating client cacheable content, as described elsewhere herein. At time $T_0$ the bandwidth utilization level 706 shown for curve 702 is within the available bandwidth, and so no degradation in streaming quality will be experienced by the user. However, at time $T_2$, a scene transition or other event occurs which causes the bandwidth utilization to dramatically increase. The bandwidth utilization rises to a peak level 708 that exceeds the maximum available bandwidth 700, thereby possibly resulting in degradation of the video/audio streaming quality. At time $T_3$, the bandwidth utilization returns to a level 710 that is within the maximum available bandwidth.

The curve 704 illustrates bandwidth utilization for a cloud gaming setup employing client caching in accordance with implementations of the disclosure. At time $T_0$ to time $T_1$, the bandwidth utilization is at a level 712, which may be somewhat below the corresponding level 706 of the conventional setup, due to the use of cacheable content at the client to provide portions of the video/audio streams. At time T1, it is determined that the user's gameplay is nearing a scene transition or other event that will require greater bandwidth utilization. Therefore, cacheable content to be used for the scene transition is streamed to the client device prior to the occurrence of the scene transition, resulting in an increase in bandwidth utilization to a level 714. It will be appreciated that the level 714 is above the level 716 of bandwidth utilization for the conventional system, but still within the available bandwidth 700.

At time T2, the scene transition occurs, and the bandwidth utilization may rise to a level 718, yet unlike the conventional system, the level 718 for the system employing client caching is still within the available bandwidth 700 so that no degradation in streaming quality occurs. At time T3, the scene transition is complete and the bandwidth utilization drops to a level 720, which may be lower than then level 710 due to the continued application of client cached content to provide portions of the video/audio streams.

In some embodiments, the client can be a general purpose computer, a special purpose computer, a portable gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 8:
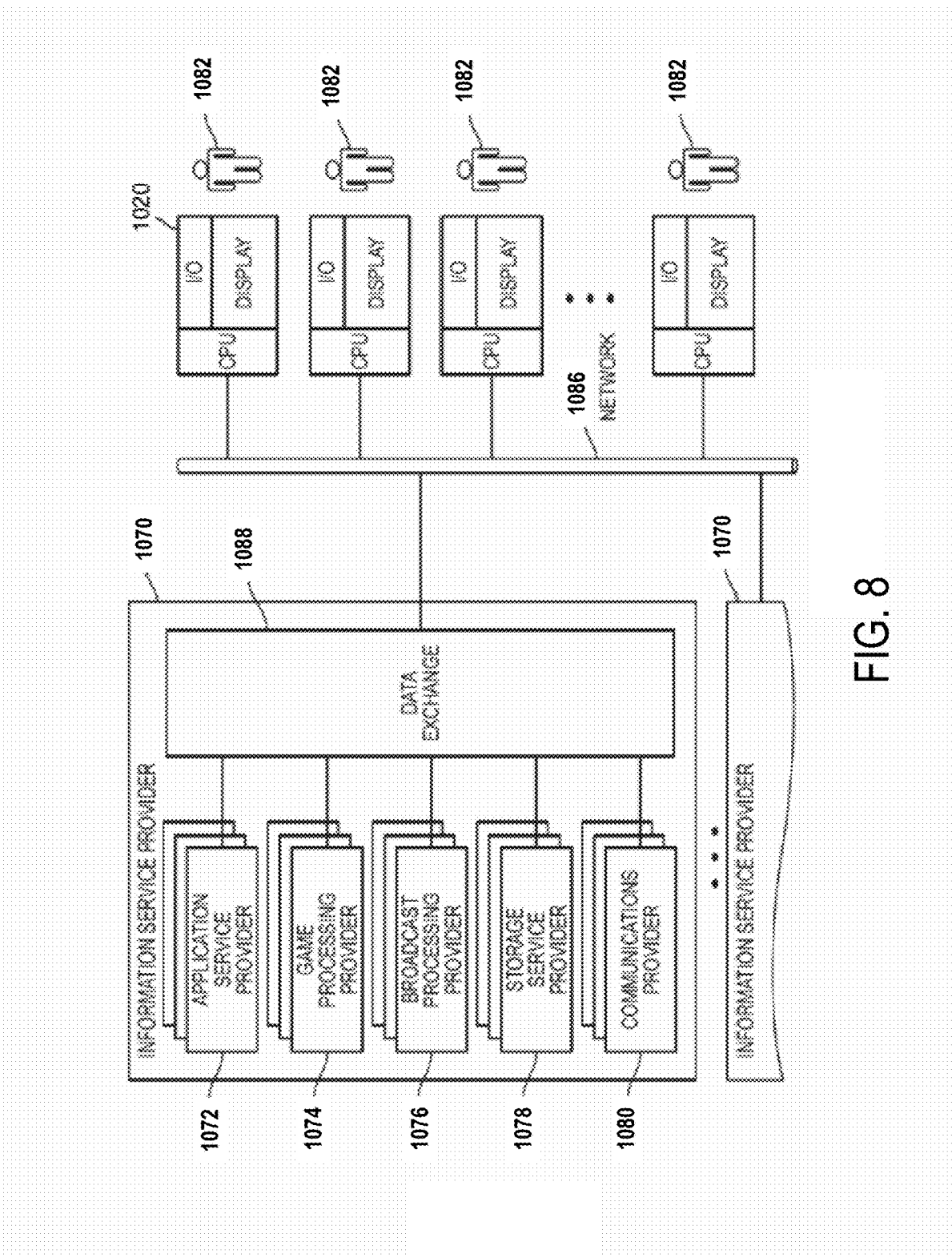
FIG. 8 illustrates an exemplary Information Service Provider architecture for delivering informational content and services to users who are geographically dispersed and connected via a network, in accordance with one embodiment of the present invention.

FIG. 8 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

Figure 9:
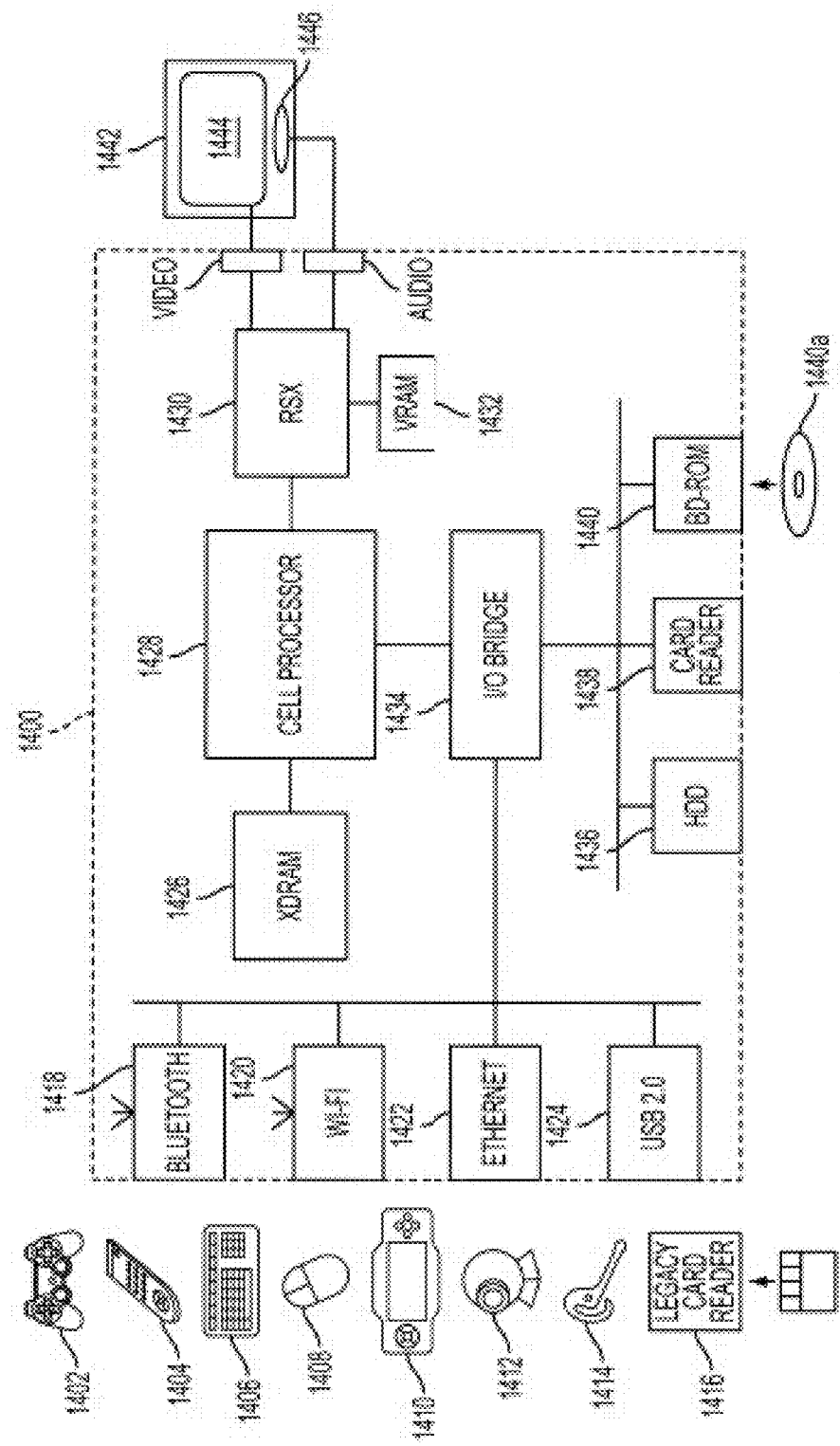
FIG. 9 illustrates exemplary components of a computing device used for controlling content presented to a user, in accordance with one embodiment of the invention.

FIG. 9 schematically illustrates the overall system architecture of a gaming console, such as Sony® Playstation 3® entertainment device, that may be compatible with controllers for implementing an avatar control system in accordance with one embodiment of the present invention. A system unit 1400 is provided, with various peripheral devices connectable to the system unit 1400. The system unit 1400 is similar to the computing server 402-*a* of FIG. 2. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation the I/O bridge 1434 handles all wireless, USB and Ethernet data, including data from one or more game controllers 1402. For example when a user is playing a game, the I/O bridge 1434 receives data from the game controller 1402 via a Bluetooth link and directs it to the Cell processor 1428, which updates the current state of the game accordingly.

The wireless, USB and Ethernet ports also provide connectivity for other peripheral devices in addition to game controllers 1402, such as: a remote control 1404; a keyboard 1406; a mouse 1408; a portable entertainment device 1410 such as a Sony Playstation Portable® entertainment device; a video camera such as an EyeToy® video camera 1412; and a microphone headset 1414. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

In the present embodiment, the game controller 1402 is operable to communicate wirelessly with the system unit 1400 via the Bluetooth link. However, the game controller 1402 can instead be connected to a USB port, thereby also providing power by which to charge the battery of the game controller 1402. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Referring now to FIG. 10 the Cell processor 1428 has an architecture comprising four basic components: external input and output structures comprising a memory controller 1560 and a dual bus interface controller 1570A,B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
receiving at a client device a first command to initiate a cloud video game;
in response to receiving the first command, retrieving, by the client device, initial content for the cloud video game from a client local storage;
rendering the initial content to a display device connected to the client device, the rendered initial content defining content of the cloud video game that does not result from interactive gameplay of the cloud video game and that is configured to be rendered prior to rendering interactive gameplay content of the cloud video game;
further upon and in response to receiving the first command, and also while retrieving and rendering the initial content, sending a first request from the client device to a cloud gaming service to access the cloud video game, the cloud gaming service being configured to, in response to receiving the first request, assign the client device to a gaming machine that is configured to execute the cloud video game and prepare for streaming of interactive gameplay content generated by the executing cloud video game to the client device;
after the game machine is ready to execute the cloud video game, transitioning from rendering the initial content obtained from the local storage to the executing cloud video game to enable initiation of interactive gameplay of the cloud video game;
in response to receiving a second command to initiate said interactive gameplay, sending a second request from the client device to the cloud gaming service, the cloud gaming service being configured to, in response to receiving the second request, initiate streaming of the interactive gameplay content generated by the executing cloud video game to the client device.

2. The method of claim 1, wherein the rendered initial content does not affect a level of user progress or accomplishment within a gameplay context of the cloud video game.

3. The method of claim 1, wherein the rendered initial content defines one or more of a recitation of legal information, a logo presentation, a splash screen, a loading screen, a rating screen, a menu.

4. The method of claim 1, wherein the rendered initial content defines a configuration procedure for an interface device that is configured to provide user-defined input for the cloud video game.

5. The method of claim 1, wherein the streaming of the interactive gameplay content to the client device is defined by transmission of a video stream and an audio stream from the cloud gaming service to the client device for rendering by the client device.

6. The method of claim 1, wherein the cloud gaming service is configured to prepare for streaming of interactive gameplay content by accessing saved game data and defining a state of the executing cloud video game in accordance with the saved game data.

7. A method, comprising:
receiving at a client device a first command to initiate a cloud video game;
in response to receiving the first command, retrieving, by the client device, initial content for the cloud video game from a client local storage;
rendering the initial content to a display device, the rendered initial content defining content of the cloud video game that does not result from interactive gameplay of the cloud video game;
further upon and in response to receiving the first command, and also while retrieving and rendering the initial content, sending a first request from the client device to a cloud gaming service to access the cloud video game, the cloud gaming service being configured to, in response to receiving the first request, execute the cloud video game and prepare for streaming of interactive gameplay content generated by the executing cloud video game to the client device;
after the game machine is ready to execute the cloud video game, transitioning from rendering the initial content obtained from the local storage to the executing cloud video game to enable initiation of interactive gameplay of the cloud video game;
in response to receiving a second command to initiate said interactive gameplay, sending a second request from the client device to the cloud gaming service, the cloud gaming service being configured to, in response to receiving the second request, initiate streaming of the interactive gameplay content generated by the executing cloud video game to the client device.

8. The method of claim 7, wherein the rendered initial content does not affect a level of user progress or accomplishment within a gameplay context of the cloud video game.

9. The method of claim 7, wherein the rendered initial content defines one or more of a recitation of legal information, a logo presentation, a splash screen, a loading screen, a rating screen, a menu, or a configuration procedure for an interface device that is configured to provide user-defined input for the cloud video game.

10. The method of claim 7, wherein the streaming of the interactive gameplay content to the client device is defined by transmission of a video stream and an audio stream from the cloud gaming service to the client device for rendering by the client device.

11. The method of claim 7, wherein the cloud gaming service is configured to prepare for streaming of interactive gameplay content by accessing saved game data and defining a state of the executing cloud video game in accordance with the saved game data.

12. The method of claim 7, further comprising:
further in response to receiving the second command and initiating streaming of the interactive gameplay content to the client device, receiving user input at the client device defined from user interactivity with the interactive gameplay content, and transmitting the user input from the client device to the cloud gaming service for processing by the executing video game.

13. The method of claim 7, further comprising:
receiving at the client device a third command to terminate gameplay of the video game;
in response to receiving the third command, sending a third request from the client device to the cloud gaming service, the cloud gaming service being configured to, in response to receiving the third request, determine whether an update to the initial content that is stored in the client local storage is required, and if so, then send the update to the client device.

\* \* \* \* \*